(12) United States Patent
Um

(10) Patent No.: US 11,693,589 B2
(45) Date of Patent: Jul. 4, 2023

(54) STORAGE DEVICE USING CACHE BUFFER AND METHOD OF OPERATING THE SAME

(71) Applicant: SK hynix Inc., Icheon-si (KR)

(72) Inventor: Gi Pyo Um, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/225,505

(22) Filed: Apr. 8, 2021

(65) Prior Publication Data

US 2022/0113900 A1    Apr. 14, 2022

(30) Foreign Application Priority Data

Oct. 13, 2020   (KR) .................. KR10-2020-0132222

(51) Int. Cl.
*G06F 3/06* (2006.01)
*G06F 12/02* (2006.01)

(52) U.S. Cl.
CPC .......... *G06F 3/0656* (2013.01); *G06F 3/0605* (2013.01); *G06F 3/0659* (2013.01); *G06F 3/0679* (2013.01); *G06F 12/0238* (2013.01); *G06F 2212/7201* (2013.01)

(58) Field of Classification Search
CPC .... G06F 3/0656; G06F 3/0605; G06F 3/0659; G06F 3/0679; G06F 12/0238; G06F 2212/7201
See application file for complete search history.

(56) References Cited

U.S. PATENT DOCUMENTS

| | | | | |
|---|---|---|---|---|
| 5,530,850 A * | 6/1996 | Ford | ................... | G11B 27/002 707/813 |
| 5,778,442 A * | 7/1998 | Ezzat | ................... | G06F 13/385 711/159 |
| 6,185,521 B1 * | 2/2001 | Vishlitzky | ............. | G06F 3/0674 710/5 |
| 6,412,045 B1 * | 6/2002 | DeKoning | .......... | G06F 12/0804 711/E12.04 |
| 8,117,396 B1 * | 2/2012 | Fair | ...................... | H04L 67/568 709/201 |
| 8,135,926 B1 * | 3/2012 | Glasco | .................. | G06F 12/084 711/155 |
| 8,549,222 B1 * | 10/2013 | Kleiman | ............... | G06F 12/126 711/113 |
| 9,026,737 B1 * | 5/2015 | Armangau | .......... | G06F 12/0897 711/136 |
| 9,715,455 B1 * | 7/2017 | Purkayastha | ....... | G06F 12/0815 |
| 10,514,848 B2 * | 12/2019 | Sun | ......................... | G06F 3/068 |

(Continued)

FOREIGN PATENT DOCUMENTS

| | | |
|---|---|---|
| KR | 10-1474344 B1 | 1/2010 |
| KR | 10-1631162 B1 | 12/2010 |

*Primary Examiner* — Ramon A. Mercado

(57) ABSTRACT

A storage device capable of maintaining consistency of data for the same address may include a memory device including a plurality of memory blocks, a buffer memory device including a plurality of cache buffers temporarily storing data previously received from a host, and a memory controller configured to receive a write request and a write data from the host and configured to control the buffer memory device and the memory device to store a previously received data, stored in one of the plurality of cache buffers with a logical address that matches a logical address of the write data, in the memory device before the write request is processed.

20 Claims, 11 Drawing Sheets

(56) References Cited

U.S. PATENT DOCUMENTS

| | | | |
|---|---|---|---|
| 2003/0212865 A1* | 11/2003 | Hicken | G06F 12/0804 |
| | | | 711/E12.04 |
| 2008/0082729 A1* | 4/2008 | Moon | G06F 12/0246 |
| | | | 711/E12.008 |
| 2008/0235468 A1* | 9/2008 | Chen | G06F 12/0246 |
| | | | 711/E12.001 |
| 2009/0144501 A2* | 6/2009 | Yim | G06F 12/0246 |
| | | | 711/120 |
| 2012/0284587 A1* | 11/2012 | Yu | G06F 12/0868 |
| | | | 711/E12.008 |
| 2014/0089569 A1* | 3/2014 | Pignatelli | G06F 3/0688 |
| | | | 711/103 |
| 2015/0081961 A1* | 3/2015 | Kwon | G11C 16/10 |
| | | | 711/103 |
| 2015/0134857 A1* | 5/2015 | Hahn | G06F 3/061 |
| | | | 710/5 |
| 2016/0196063 A1* | 7/2016 | Chung | G06F 3/061 |
| | | | 711/103 |
| 2016/0217847 A1* | 7/2016 | Ha | G11C 7/1045 |
| 2016/0328155 A1* | 11/2016 | Um | G06F 3/0679 |
| 2017/0038969 A1* | 2/2017 | Choi | G06F 3/0656 |
| 2017/0153826 A1* | 6/2017 | Cho | G06F 3/0656 |
| 2017/0336983 A1* | 11/2017 | Roh | G06F 12/128 |
| 2017/0371548 A1* | 12/2017 | Um | G06F 12/0246 |
| 2018/0357170 A1* | 12/2018 | Benisty | G06F 12/0804 |
| 2019/0205038 A1* | 7/2019 | Lee | G06F 3/064 |
| 2020/0104048 A1* | 4/2020 | Habbinga | G06F 3/0604 |
| 2022/0019357 A1* | 1/2022 | Cho | G06F 21/79 |
| 2022/0113900 A1* | 4/2022 | Um | G06F 12/0804 |

* cited by examiner

STORAGE DEVICE USING CACHE BUFFER AND METHOD OF OPERATING THE SAME

CROSS-REFERENCE TO RELATED APPLICATION

The present application claims priority under 35 U.S.C. § 119(a) to Korean patent application number 10-2020-0132222, filed on Oct. 13, 2020, in the Korean Intellectual Property Office, the entire disclosure of which is incorporated herein by reference.

BACKGROUND

1. Technical Field

The present disclosure relates to an electronic device, and more particularly, to a storage device and a method of operating the same.

2. Related Art

A storage device is a device that stores data under control of a host device such as a computer or a smartphone. A storage device may include a memory device storing data and a memory controller controlling the memory device. Memory devices may be classified into volatile memory devices and nonvolatile memory devices.

A volatile memory device may be a memory device that stores data only when power is supplied and loses the stored data when the power supply is cut off. Examples of a volatile memory device may include a static random access memory (SRAM), a dynamic random access memory (DRAM), and the like.

A nonvolatile memory device is a device that does not lose data even though power is cut off. Examples of a nonvolatile memory device includes a read only memory (ROM), a programmable ROM (PROM), an electrically programmable ROM (EPROM), an electrically erasable and programmable ROM (EEPROM), a flash memory, and the like.

SUMMARY

Embodiments of the present disclosure provide a storage device capable of maintaining consistency of data for the same address, and a method of operating the same.

According to an embodiment of the present disclosure, a storage device may include a memory device including a plurality of memory blocks, a buffer memory device including a plurality of cache buffers temporarily storing data previously received from a host, and a memory controller configured to receive a write request and a write data from the host and configured to control the buffer memory device and the memory device to store a previously received data, stored in one of the plurality of cache buffers with a logical address that matches a logical address of the write data, in the memory device before the write request is processed.

According to an embodiment of the present disclosure, a memory controller that controls a memory device may include a first cache buffer configured to temporarily store data having a first attribute among data provided from a host, a second cache buffer configured to temporarily store data having a second attribute among the data provided from the host, a first command list storage configured to store commands related to a logical address of the data stored in the first cache buffer, a second command list storage configured to store commands related to a logical address of the data stored in the second cache buffer, and a write operation controller configured to control the memory device to store the data that is temporarily stored in the second cache buffer in the memory device when a write data having the first attribute is input from the host and a command related to the same logical address as a logical address of write data is stored in the second command list storage.

According to an embodiment of the present disclosure, a method of operating a memory controller that controls a memory device may include temporarily storing data input from a host in a cache buffer among a plurality of cache buffers according to an attribute of the data, and controlling the memory device to store a previous data having the same logical address as the data input from the host, stored in a different cache buffer among the plurality of cache buffers in the memory device, before storing the data input from a host, which was temporarily stored in the cache buffer, in the memory device.

According to the present technology, a storage device capable of maintaining consistency of data for the same address, and a method of operating the same are provided.

DETAILED DESCRIPTION

Specific structural or functional descriptions of embodiments according to the concepts which are disclosed in the present specification or application are illustrated only to describe the embodiments according to the concepts of the present disclosure. The embodiments according to the concepts of the present disclosure may be carried out in various forms and the descriptions are not limited to the embodiments described in the present specification or application.

Figure 1:
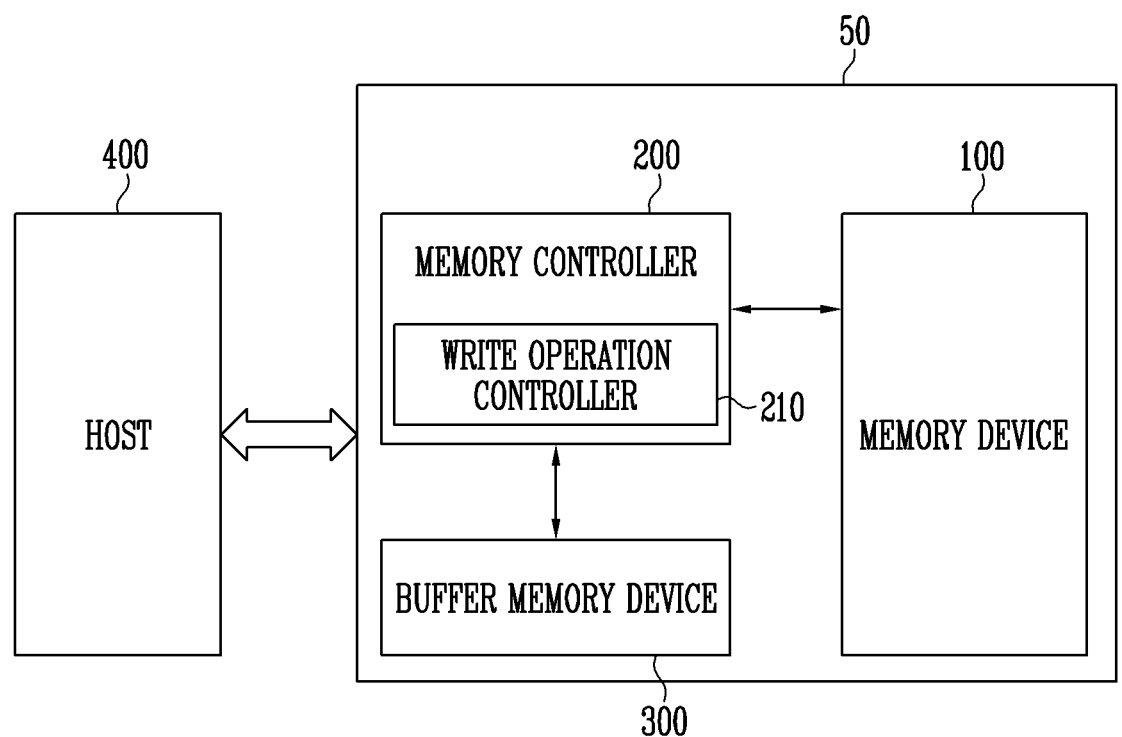
FIG. 1 is a diagram illustrating a storage device according to an embodiment of the present disclosure.

FIG. 1 is a diagram illustrating a storage device including a memory device according to an embodiment of the present disclosure.

Referring to FIG. 1, a storage device 50 may include a memory device 100, a memory controller 200, and a buffer memory device 300. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 and that stores high-capacity data in one place, such as in a server or a data center.

The storage device 50 may be manufactured as one of various types of storage devices according to a host interface that is a communication method with the host 400. For example, the storage device 50 may be configured as any one of various types of storage devices such as a Solid State Drive (SSD), a multimedia card in a form of a Multi-Media Card (MMC), an Embedded MMC (eMMC), a Reduced Size MMC (RS-MMC), a micro-MMC (micro-MMC), a secure digital card in a form of a Secure Digital (SD) card, a mini-SD card, a micro-SD card, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card (SMC), and a memory stick, and the like.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) that includes a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. Each memory block may include a plurality of memory cells. Each memory block may include a plurality of pages. In an embodiment, a page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware (FW). When the memory device 100 is a flash memory device, the memory controller 200 may execute firmware such as a flash translation layer (FTL) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform the program operation, the read operation, or the erase operation according to a request of the host 400. During the program operation, the memory controller 200 may provide a program command, a PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently, or regardless of a request from the host 400, and transmit the command, the address, and the data to the memory device 100.

For example, the memory controller 200 may provide the command, the address, and the data for performing a program operation, a read operation and a erase operation that accompany the performing of wear leveling, read reclaim, garbage collection, and the like, to the memory device 100.

In an embodiment, the memory controller 200 may control at least two or more memory devices 100. The memory controller 200 may control the memory devices 100 according to an interleaving method to improve operation performance. The interleaving method may be a method of controlling operations for at least two memory devices 100 to overlap with each other.

The memory controller 200 may further include a write operation controller 210.

The write operation controller 210 may process a write request input from the host 400. The write operation controller 210 may store write data provided with the write request in the buffer memory device 300 in response to the write request input from the host 400, and may generate a command used to store the write data in the memory device 100. The write operation controller 210 may provide the generated command and write data to the memory device 100. In an embodiment, when data of a preset size is secured in the buffer memory device 300, the write operation controller 210 may generate a flush command for storing data, which is temporarily stored in the buffer memory device 300, in the memory device 100. The write operation controller 210 may control the memory device 100 and the buffer memory device 300 to store data, which is stored in the buffer memory device 300, in the memory device 100 according to the flush command.

According to an embodiment of the present disclosure, in response to the write request input from the host 400, the write operation controller 210 may determine whether data having the same logical address as a logical address of the write data has been previously stored in the buffer memory device 300. When the previously stored data, having the same logical address as the logical address of the write data, is previously stored in the buffer memory device 300, the write operation controller 210 may store the previously stored data, which is temporarily stored in the buffer memory device 300, in the memory device 100, and then process the write request.

The buffer memory device 300 may temporarily store the write data provided from the host 400 before storing the write data in the memory device 100. Alternatively, the buffer memory device 300 may temporarily store the data obtained from the memory device 100 before providing the data to the host 400.

The buffer memory device 300 may include a plurality of cache buffers. A cache buffer may be a temporary storage space having a preset size. The buffer memory device 300 may temporarily store the write data in different cache buffers according to attribute information of the write data. Since data stored in the same cache buffer may be stored in the memory device 100 together, the data may be stored in the same memory block. That is, when the data, which are stored in the different cache buffers, are stored in the memory device 100, the data may be stored in different memory blocks, respectively.

In an embodiment, an attribute information of the write data may be information indicating whether the write data corresponds to hot data or cold data. When the hot data and the cold data are separately managed, operation performance of the storage device 50 may be improved. For example, the hot data may be data having a number of accesses relatively higher than that of the cold data. Therefore, when the hot data and the cold data are separately managed, the hot data having a relatively high number of accesses may be stored in the memory block including the memory cells programmed with the SLC, and the cold data may be stored in the memory block including the memory cells programmed with the MLC, the TLC or the QLC. Consequently, the hot data having a relatively high number of accesses may be provided to the host 400 faster because a read speed of the SLC is faster than that of the MLC, TLC, or QLC.

In an embodiment, the attribute information of the write data may be information on an application that has generated the write data. The write data provided from the host 400 may be generated by various applications executed by the host 400. Because the write data having the same attribute may be managed together, and the write data generated by the same application may be requested to be read together, a response speed to the read request may be improved.

In an embodiment, the attribute information of the write data may be information on an access response speed to the write data. For example, data requiring a relatively fast access response speed may be stored in the memory block including the memory cells programmed with the SLC, and data requiring a relatively slow access response speed may be stored in the memory block including the memory cells programmed with the MLC, the TLC or the QLC. Therefore, the storage device 50 may flexibly manage data according to the response speed requested by the host 400.

In an embodiment, the attribute information of the write data may be information on reliability required for the write data. For example, data requiring relatively high reliability may be stored in the memory block including the memory cells programmed with the SLC, and data requiring relatively low reliability may be stored in the memory block including the memory cells programmed with the MLC, the TLC or the QLC. Therefore, the storage device 50 may store data in the memory device 100 according to the reliability of the data requested by the host 400.

In an embodiment, the buffer memory device 300 may be a volatile memory device. For example, the buffer memory device 300 may be a dynamic random access memory (DRAM) or a static random access memory (SRAM).

In FIG. 1, the buffer memory device 300 is positioned outside the memory controller 200, but in other embodiments, the buffer memory device 300 may be integrated into the memory controller 200 and may be included in one chip of the memory controller 200.

The host 400 may communicate with the storage device 50 using at least one of various communication methods such as for example a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
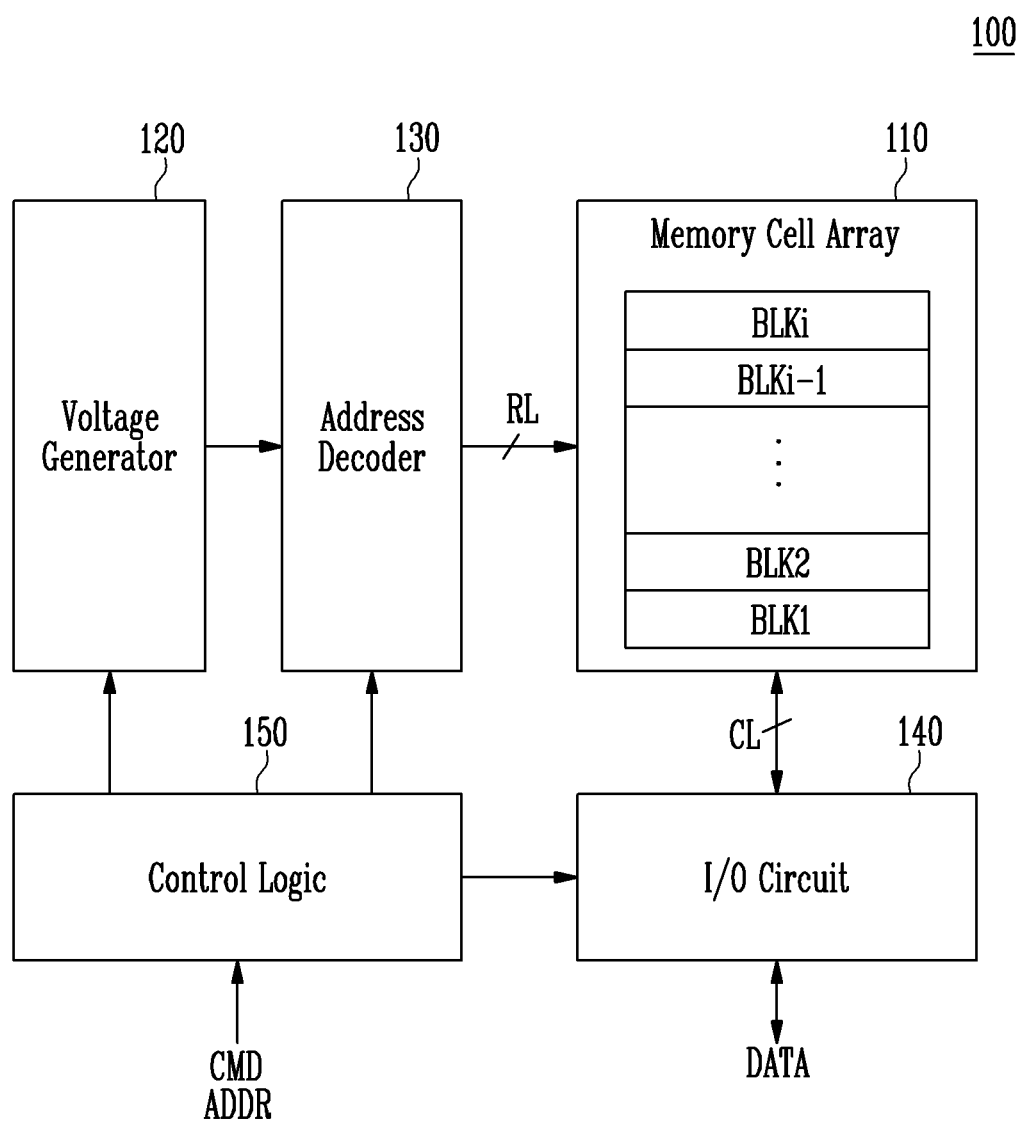
FIG. 2 is a diagram illustrating a memory device of FIG. 1.

FIG. 2 is a diagram illustrating a memory device of FIG. 1.

Referring to FIG. 2, a memory device 100 may include a memory cell array 110, a voltage generator 120, an address decoder 130, an input/output circuit 140, and a control logic 150.

The memory cell array 110 includes a plurality of memory blocks BLK1 to BLKi (where i is a positive integer). The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line from among the plurality of memory cells may be defined as one physical page. That is, the memory cell array 110 may include a plurality of physical pages. Each of the memory cells of the memory device 100 may be configured as an SLC that stores one data bit, an MLC that stores two data bits, a TLC that stores three data bits, or a QLC capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

As an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate a plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate a plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block from among the memory blocks BLK1 to BLKi according to the decoded block address. The address decoder 130 may decode a row address among the received addresses ADDR. The address decoder 130 may select at least one word line from among word lines of a selected memory block according to the decoded row address. In an embodiment, the address decoder 130 may decode a column address from among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through column or bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to a command CMD transmitted from an external device. The control logic 150 may generate control signals in response to the command CMD and the address ADDR to control the peripheral circuits.

Figure 3:
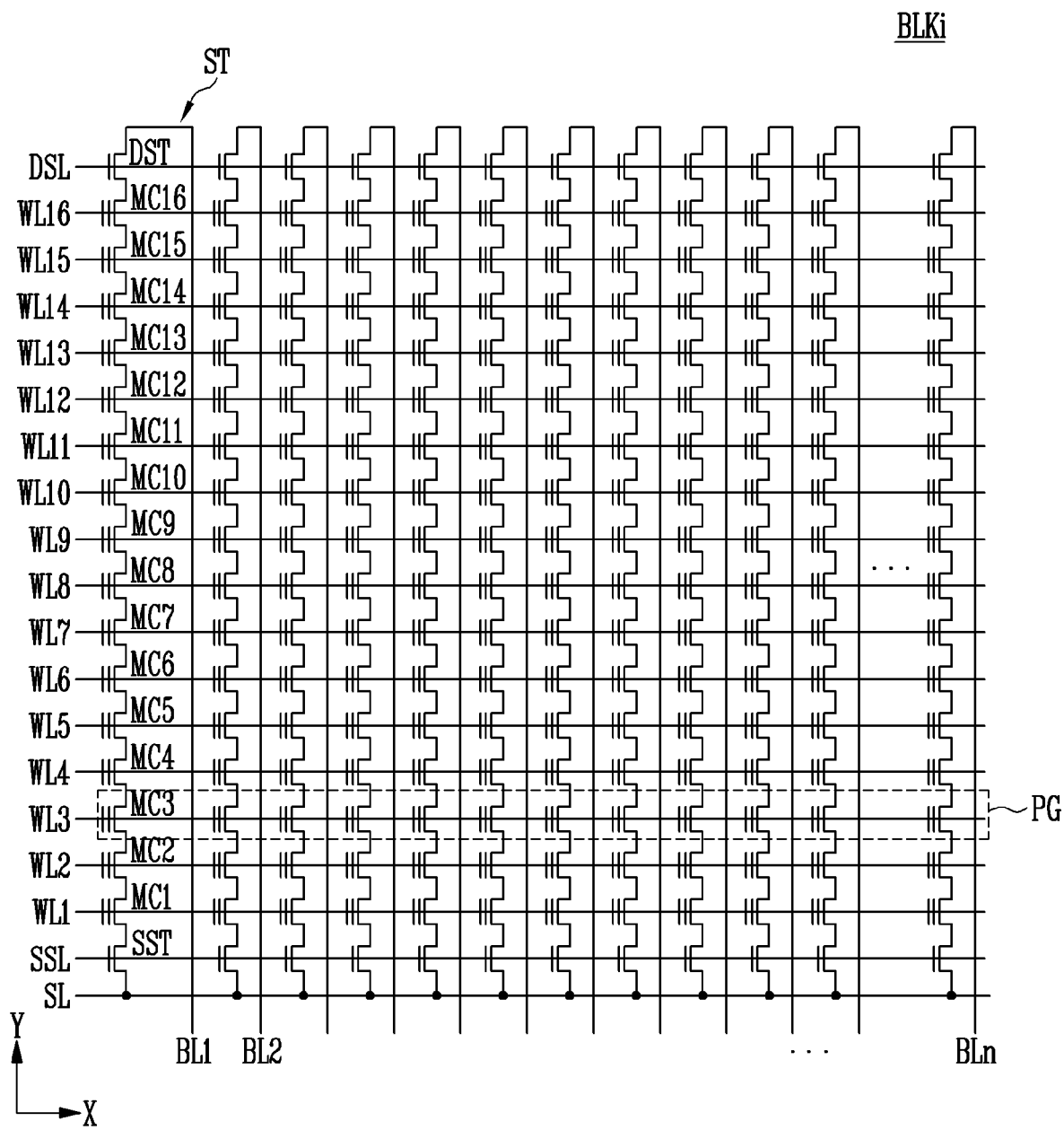
FIG. 3 is a diagram illustrating a configuration of any one of the memory blocks of FIG. 2.

FIG. 3 is a diagram illustrating a configuration of any one of the memory blocks of FIG. 2.

In FIG. 3, a memory block BLKi is any one memory block BLK from among the memory blocks BLK1 to BLKi of FIG. 2.

Referring to FIG. 3, a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between the bit lines BL1 to BLn (where n is a positive integer) and a source line SL. The bit lines BL1 to BLn may be connected to the strings ST, respectively, and the source line SL may be commonly connected to the strings ST. As an example, a string ST connected to the first bit line BL1 is specifically described. The strings ST may be configured to be identical to each other.

The string ST may include a source select transistor SST, a plurality of memory cells MC1 to MC16, and a drain select transistor DST connected in series between the source line SL and the first bit line BL1. In embodiments of the disclosure, one string ST may include at least one or more of the source select transistor SST and the drain select transistor DST, and may include a number of memory cells more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16, respectively. A group of the memory cells connected to the same word line from among the memory cells included in different strings ST may be referred to as a page PG. Therefore, the memory block BLKi may include the pages PG in the same number as the word lines WL1 to WL16.

A memory cell may store one bit of data. This is commonly called a single level cell (SLC). In this case, one physical page PG may store one logical page (LPG) data. The one logical page (LPG) data may include data bits that number the same as cells included in one physical page PG.

A memory cell may store two or more bits of data. In this case, one physical page PG may store two or more logical page (LPG) data.

Figure 4:
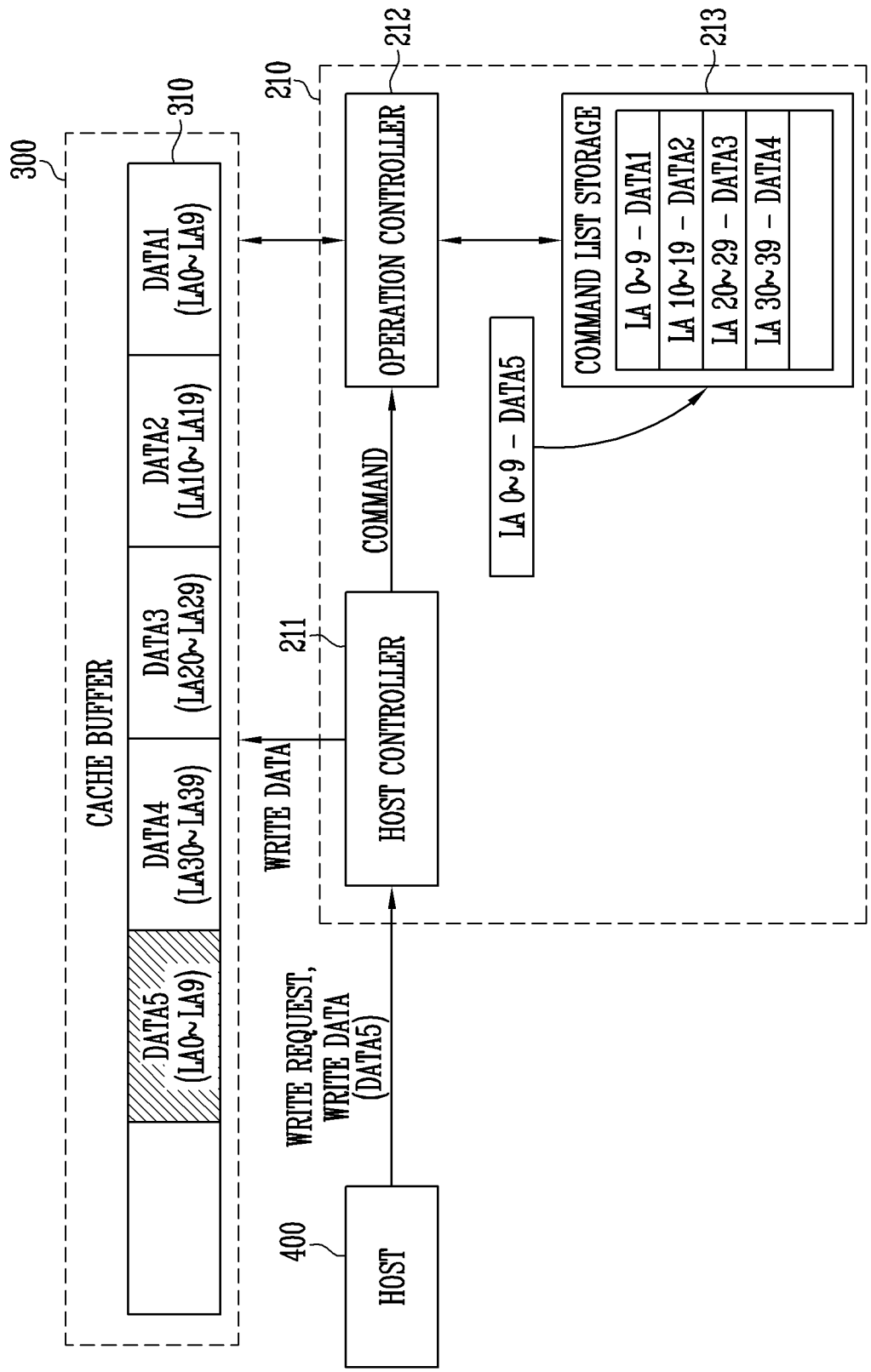
FIG. 4 is a diagram illustrating an operation of a storage device according to an embodiment of the present disclosure.

FIG. 4 is a diagram illustrating an operation of a storage device according to an embodiment of the present disclosure.

Referring to FIG. 4, a write operation controller 210 included in a storage device may include a host controller 211, an operation controller 212, and a command list storage 213.

The host controller 211 may receive a write request and a write data from a host 400.

A buffer memory device 300 may include a cache buffer 310. The cache buffer 310 may be an area for temporarily storing the write data provided from the host 400.

The host controller 211 may control the buffer memory device 300 to temporarily store the write data in the cache buffer 310. The host controller 211 may generate a command corresponding to the logical address of the write data and provide the generated command to the operation controller 212.

The operation controller 212 may store the received command in the command list storage 213. The command list storage 213 may sequentially store commands respectively corresponding to logical addresses of the write data stored in the cache buffer 310.

In FIG. 4, the cache buffer 310 is in a state in which the write data is stored in an order of first data DATA1 corresponding to logical addresses 0 to 9 LA0 to LA9, second data DATA2 corresponding to logical addresses 10 to 19 LA10 to LA19, third data DATA3 corresponding to logical addresses 20 to 29 LA20 to LA29, and fourth data DATA4 corresponding to logical addresses 30 to 39 LA30 to LA39. In addition, commands corresponding to respective logical addresses of the first to fourth data DATA1 to DATA4 are stored in the command list storage 213.

In this state, when fifth data DATA5 corresponding to logical addresses 0 to 9 LA0 to LA9 is input, the first data DATA1 and the fifth data DATA5 exist simultaneously as data corresponding to the logical addresses 0 to 9 LA0 to LA9 in the cache buffer 310. The first data DATA1 may be treated as old data that is invalid data, and the fifth data DATA5 may be treated as valid data as the latest or most recent data corresponding to the logical addresses 0 to 9 LA0 to LA9.

Thereafter, when the write data is additionally input, after the host controller 211 stores all data in a space of the cache buffer 310, the host controller 211 may generate a flush command for storing the data that is stored in the cache buffer 310 into the memory device 100 described with reference to FIG. 1, and may provide the generated flush command to the operation controller 212.

The operation controller 210 may control the memory device 100 and the buffer memory device 300 to store, according to the flush command, the data that is stored in the cache buffer 310 into the memory device 100.

Figure 5:
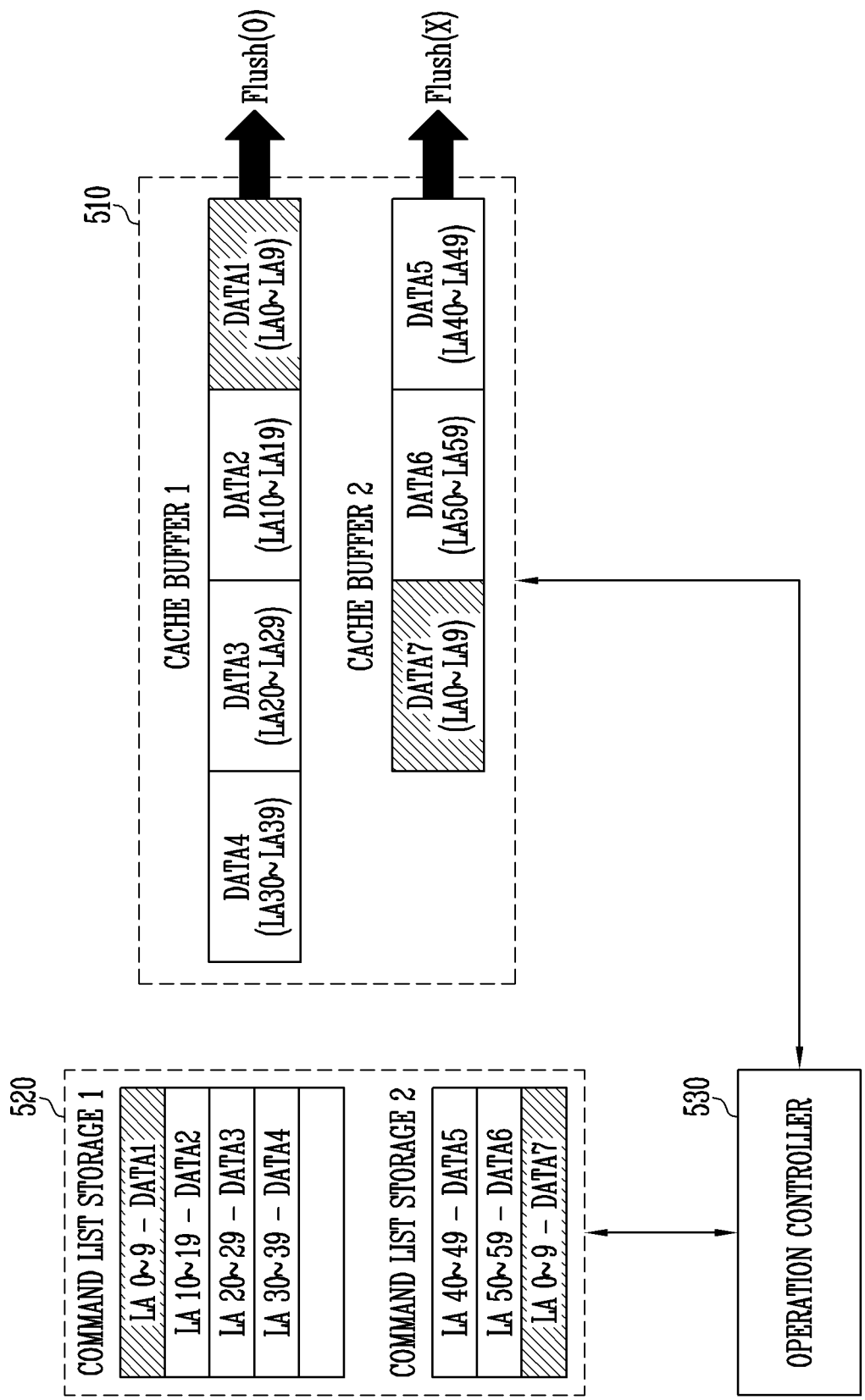
FIG. 5 is a diagram illustrating a state in which data is temporarily stored in a plurality of cache buffers.

FIG. 5 is a diagram illustrating a state in which data is temporarily stored in a plurality of cache buffers.

Referring to FIG. 5, an embodiment in which a storage device temporarily stores data using a plurality of cache buffers 510 of a buffer memory device is shown.

The plurality of cache buffers 510 may include a cache buffer 1 and a cache buffer 2. Write data provided by a host 400 described with reference to FIG. 1 may be temporarily stored in any one of the cache buffer 1 or the cache buffer 2 according to attribute information included in a write request.

For example, the attribute information of the write data may be information indicating whether the write data is hot data or cold data. When hot data and cold data are separately managed, operation performance of a storage device 50 may be improved. For example, hot data may be data having a number of accesses that is relatively higher than that of cold data. Therefore, when hot data and cold data are separately managed, hot data having a relatively high number of accesses may be stored in a memory block including memory cells programmed with SLC, and cold data may be stored in a memory block including memory cells programmed with MLC, TLC or QLC. Because a read speed of the SLC is faster than that of the MLC, TLC, or QLC, the hot data having a relatively high number of accesses may be provided to the host 400 faster.

In an embodiment, the attribute information of the write data may be information on an application that has generated the write data. The write data provided from the host 400 may be generated by various applications executed by the host 400. Because the write data generated by the same application may be requested to be read together, when the write data is managed as data having this same attribute, a response speed to a read request may be improved.

In an embodiment, the attribute information of the write data may be information on an access response speed to the write data. For example, data requiring a relatively fast access response speed may be stored in a memory block including the memory cells programmed with the SLC, and data requiring a relatively slow access response speed may be stored in a memory block including the memory cells programmed with the MLC, the TLC or the QLC. Therefore, the storage device 50 may flexibly manage data according to the response speed requested by the host 400.

In an embodiment, the attribute information of the write data may be information on reliability required for the write data. For example, data requiring relatively high reliability may be stored in a memory block including the memory cells programmed with the SLC, and data requiring relatively low reliability may be stored in a memory block including the memory cells programmed with the MLC, the TLC or the QLC. Therefore, the storage device 50 may store data in the memory device 100 according to the reliability of the data requested by the host 400.

The cache buffer 1 may temporarily store first data DATA1 corresponding to logical addresses 0 to 9 LA0 to LA9, second data DATA2 corresponding to logical addresses 10 to 19 LA10 to LA19, third data DATA3 corresponding to logical addresses 20 to 29 LA20 to LA29, and fourth data DATA4 corresponding to logical addresses 30 to 39 LA30 to LA39. The cache buffer 2 may temporarily store fifth data DATA5 corresponding to logical addresses 40 to 49 LA40 to LA49, and sixth data DATA6 corresponding to logical addresses 50 to 59 LA50 to LA59. From this initial state, it is assumed that a seventh data DATA7 corresponding to the logical addresses 0 to 9 LA0 to LA9 is input from the host 400.

In FIG. 5, the attribute information of the seventh data DATA7 has the same attribute information as the remaining data stored in the cache buffer 2. On the other hand, when the attribute information of the seventh data DATA7 is the same as the attribute information of the first to fourth data DATA1 to DATA4 stored in the cache buffer 1, the seventh data DATA7 may be stored in the cache buffer 1. In this case, the form of cache buffer 1 of FIG. 5 would be substantially the same as the cache buffer illustrated in FIG. 4, in which the fifth data DATA5, which is input relatively later, may not be stored first.

However, referring again to FIG. 5, the attribute information of the seventh data DATA7 is the same as the data stored in the cache buffer 2. Therefore, when the cache buffer 2 is first flushed and the seventh data DATA7 is stored in the memory device 100, a problem may arise because the first data DATA1 that would have been treated as invalid data may now be treated as the latest data corresponding to the logical addresses 0 to 9 LA0 to LA9. First data DATA1 would then be treated as valid data, which reduces the reliability of data stored in the storage device 50.

Therefore, according to embodiments of the present disclosure, when data having the same logical address as the write data is previously stored in the cache buffers, the storage device 50 ensures that the cache buffer in which the data having the same logical address as the write data is stored is first flushed. Therefore, a problem may not occur in the reliability of data.

Figure 6:
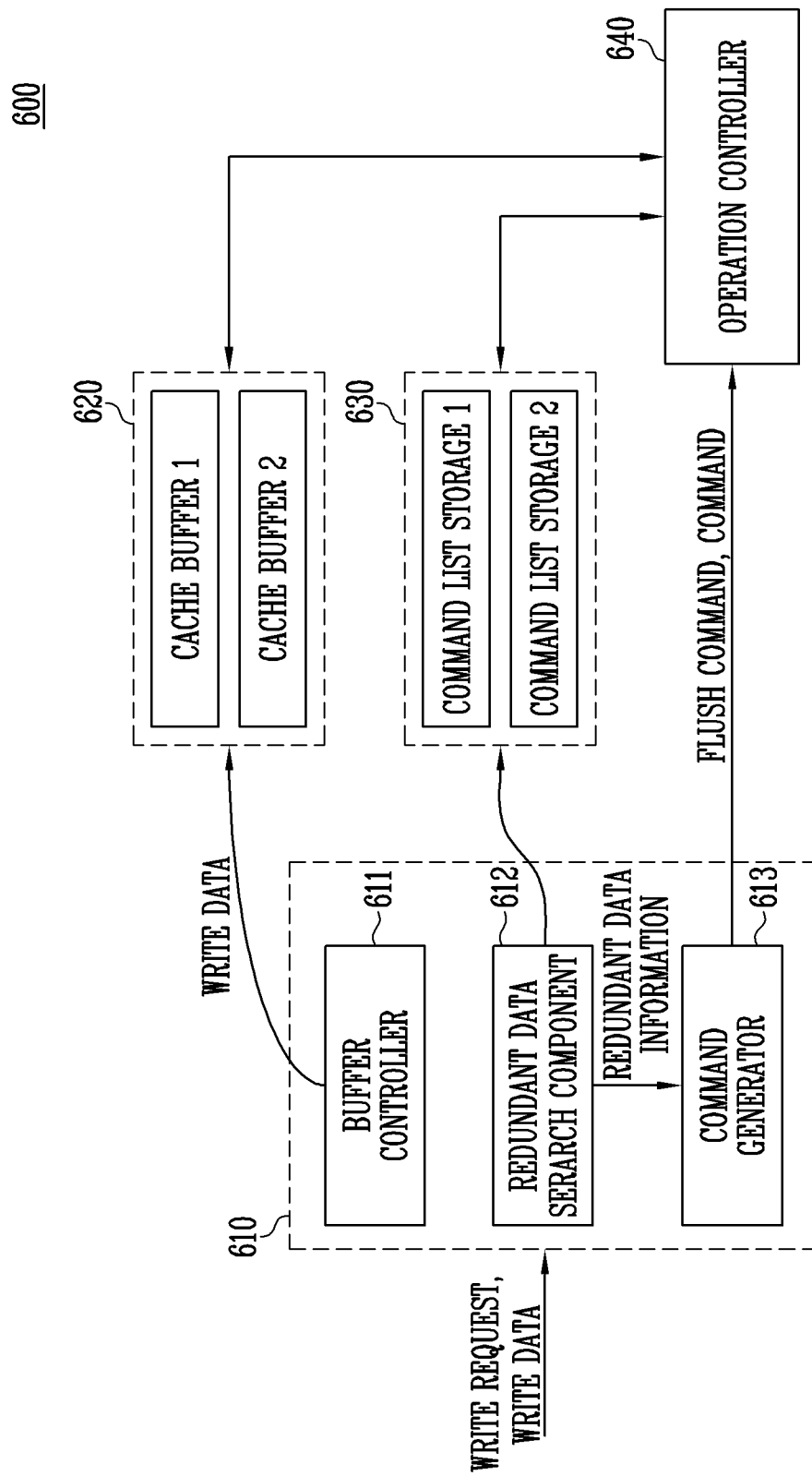
FIG. 6 is a block diagram illustrating a structure of a storage device according to an embodiment of the present disclosure.

FIG. 6 is a block diagram illustrating a structure of a storage device according to an embodiment of the present disclosure.

Referring to FIG. 6, a storage device 600 may further include a write operation controller 610, a buffer memory device 620, a plurality of command list storages 630, and an operation controller 640.

The write operation controller 610 may further include a buffer controller 611, a redundant data search component 612, and a command generator 613.

The buffer memory device 620 may include a cache buffer 1 and a cache buffer 2.

The plurality of command list storages 630 may include a command list storage 1 and a command list storage 2.

The command list storage 1 may store commands related to a logical address of data stored in the cache buffer 1. The command list storage 2 may store commands related to a logical address of data stored in the cache buffer 2.

The buffer controller 611 may store a write data received from a host 400 described with reference to FIG. 1 in any one of the cache buffer 1 and the cache buffer 2 according to attribute information. In an embodiment, the attribute information may be information indicating whether the write data corresponds to hot data or cold data. In other embodiments, the attribute information may be information on an application that has generate the write data. In still other embodiments, the attribute information may be information on an access response speed for the write data. In yet other embodiments, the attribute information may include information on reliability required for the write data.

The redundant data search component 612 may determine whether a data corresponding to the same logical address as the logical address of the write data is previously stored in the cache buffer 1 and the cache buffer 2. In an embodiment, the redundant data search component 612 may search only the remaining cache buffers, except for the cache buffer in which the write data is stored. Specifically, the redundant data search component 612 may search the command list storage 1 and the command list storage 2 to determine whether a command corresponding to the same logical address as the logical address of the write data exists. Alternatively, the redundant data search component 612 may search the remaining command list storages, except for the command list storage corresponding to the cache buffer in which the write data is stored, to determine whether a command corresponding to the same logical address as the logical address of the write data exists in a command list storage other than the command list storage corresponding to the cache buffer in which the write data is stored.

The redundant data search component 612 may generate redundant data information indicating whether a command corresponding to the same logical address as the logical address of the write data exists in the plurality of command list storages 630. The redundant data search component 612 may provide the generated redundant data information to the command generator 613.

The command generator 613 may generate a command corresponding to the logical address of the write data based on the redundant data information, or generate a flush command instructing storing of the previously stored data, which is stored in any one of the cache buffer 1 and the cache buffer 2, into the memory device. Here, the redundant data information may include information on the command list storage in which the command, corresponding to the same logical address as the logical address of the write data, is stored from among the commands stored in the plurality of command list storages 630.

For example, in response to the redundant data information indicating that the command corresponding to the same logical address as the logical address of the write data exists, the command generator 613 may generate a flush command for the cache buffer corresponding to the command list storage in which the command corresponding to the same logical address as the logical address of the write data is stored. Thus, when a command list storage includes a logical address that is the same as the logical address of the write data, and the previously stored data is stored in a cache buffer among the cache buffer 1 and the cache buffer 2, the operation controller 640 may control the memory device to perform the program operation of storing the previously stored data in the memory device according to the flush command.

Alternatively, in response to the redundant data information indicating that a command corresponding to the same logical address as the logical address of the write data does not exist from among the commands stored in the plurality of command list storages 630, the command generator 613 may generate a command corresponding to the logical address of the write data. The operation controller 640 may store the command corresponding to the logical address of the write data in the command list storage, from among the plurality of command list storages 630, corresponding to the cache buffer in which the write data is stored.

The data respectively stored in the cache buffer 1 and the cache buffer 2 may be stored in different memory blocks from among the plurality of memory blocks included in the memory device. For example, the data stored in the cache buffer 1 may be stored in a memory block programmed in an SLC method, and the data stored in the cache buffer 2 may be stored in a memory block programmed in a method of storing a plurality of bits for each memory cell.

Figure 7:
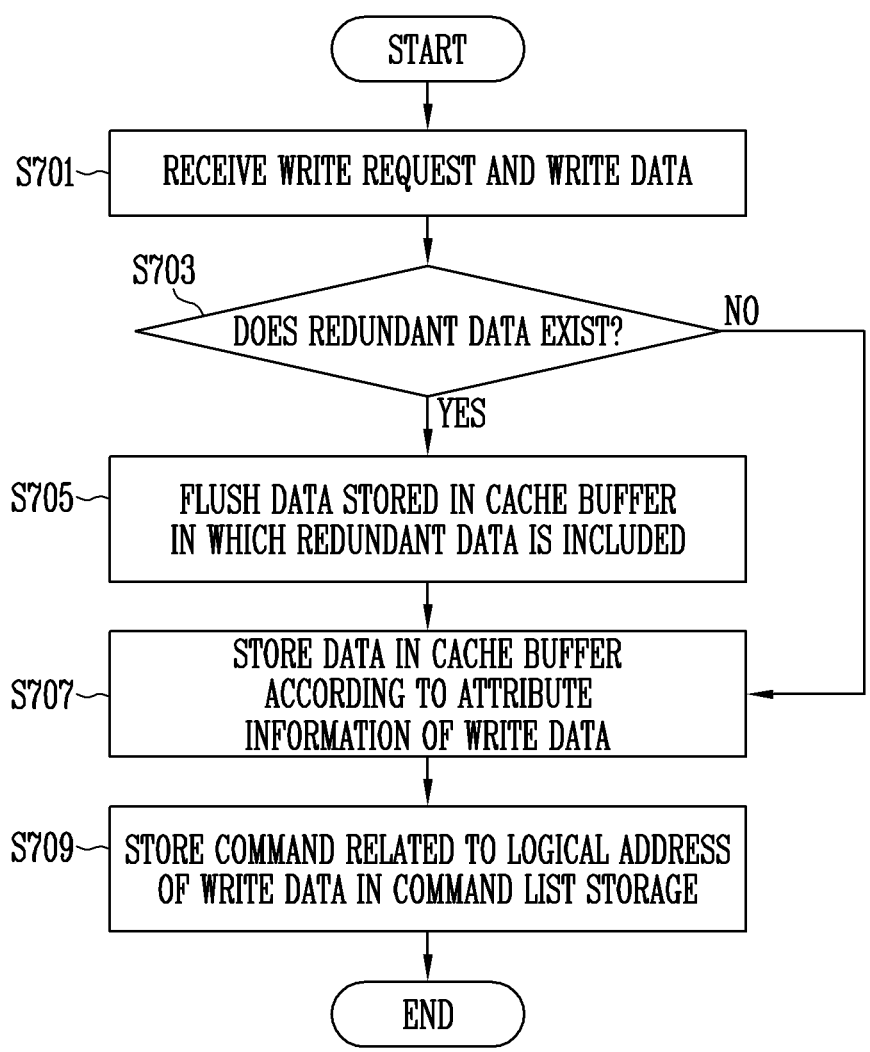
FIG. 7 is a flowchart illustrating a method of operating a memory controller according to an embodiment of the present disclosure.

FIG. 7 is a flowchart illustrating a method of operating a memory controller according to an embodiment of the present disclosure.

Referring to FIG. 7, in step S701, a memory controller may receive a write request and a write data from a host. In step S703, the memory controller may determine whether a command corresponding to the same logical address as a logical address of the write data is present among the commands stored in a plurality of command list storages. That is, the memory controller may determine whether data corresponding to the same logical address as the logical address of the write data is stored in the plurality of cache buffers before the write request is input. When the data corresponding to the same logical address as the logical address of the write data is stored in the plurality of cache buffers before the write request is input, redundant data exists. When the data corresponding to the same logical address as the logical address of the write data is not stored in the plurality of cache buffers before the write request is input, redundant data does not exist.

In step S705, the memory controller may generate a flush command for storing the redundant data, that is, the data stored in the cache buffer in which the data corresponding to the same logical address as the logical address of the write data is stored. According to the flush command, the redundant data may be stored in the memory device. That is, the data corresponding to the same logical address as the logical address of the write data that is stored in the cache buffer may be stored in the memory device.

In step S707, the memory controller may store the data in any one of a plurality of cache buffers according to attribute information of the write data. In FIG. 7, step S707 is performed after performing the flush operation in step S705, but in various other embodiments, step S707 may be performed before step S703.

In step S709, the memory controller may generate a command related to the logical address of the write data, and store the generated command in the command list storage corresponding to the cache buffer in which the write data is stored.

Figure 8:
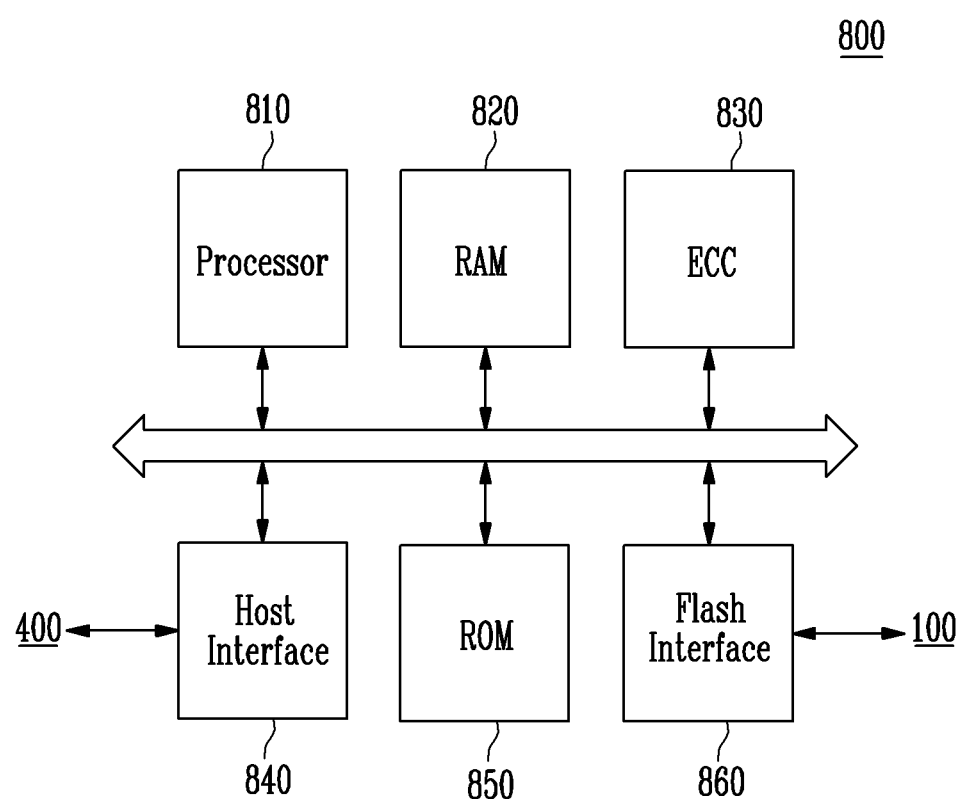
FIG. 8 is a diagram illustrating another embodiment of a memory controller of FIG. 1.

FIG. 8 is a diagram illustrating another embodiment of a memory controller of FIG. 1.

Referring to FIG. 8, a memory controller 800 may include a processor 810, a RAM 820, an error correction circuit ECC 830, a host interface 840, a ROM 850, and a flash interface 860.

The processor 810 may control an overall operation of the memory controller 800. The RAM 820 may be used as a buffer memory, a cache memory, an operation memory, and the like of the memory controller 800. For example, the write operation controller 210 described with reference to FIG. 1 may be stored in the RAM 820 or the ROM 850 in a form of software included in firmware executed by the processor 810.

The ROM 850 may store various pieces of information required for the memory controller 800 to operate in a firmware form.

The memory controller 800 may communicate with an external device (for example, the host 400, an application processor, and the like) through the host interface 840.

The memory controller 800 may communicate with the memory device 100 through the flash interface 860. The memory controller 800 may transmit a command CMD, an address ADDR, a control signal CTRL, and the like to the memory device 100 and receive data DATA through the flash interface 860. For example, the flash interface 860 may include a NAND interface.

Figure 9:
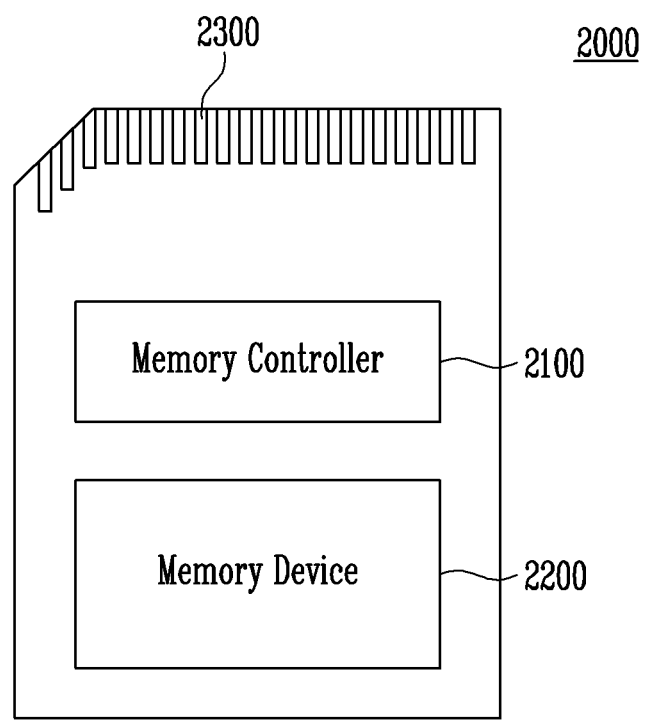
FIG. 9 is a block diagram illustrating a memory card system to which a storage device according to an embodiment of the present disclosure is applied.

FIG. 9 is a block diagram illustrating a memory card system to which a storage device according to an embodiment of the present disclosure is applied.

Referring to FIG. 9, a memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error correction circuit.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMC-micro, or eMMC), an SD card (SD, miniSD, microSD, or SDHC), and a universal flash storage (UFS).

Figure 10:
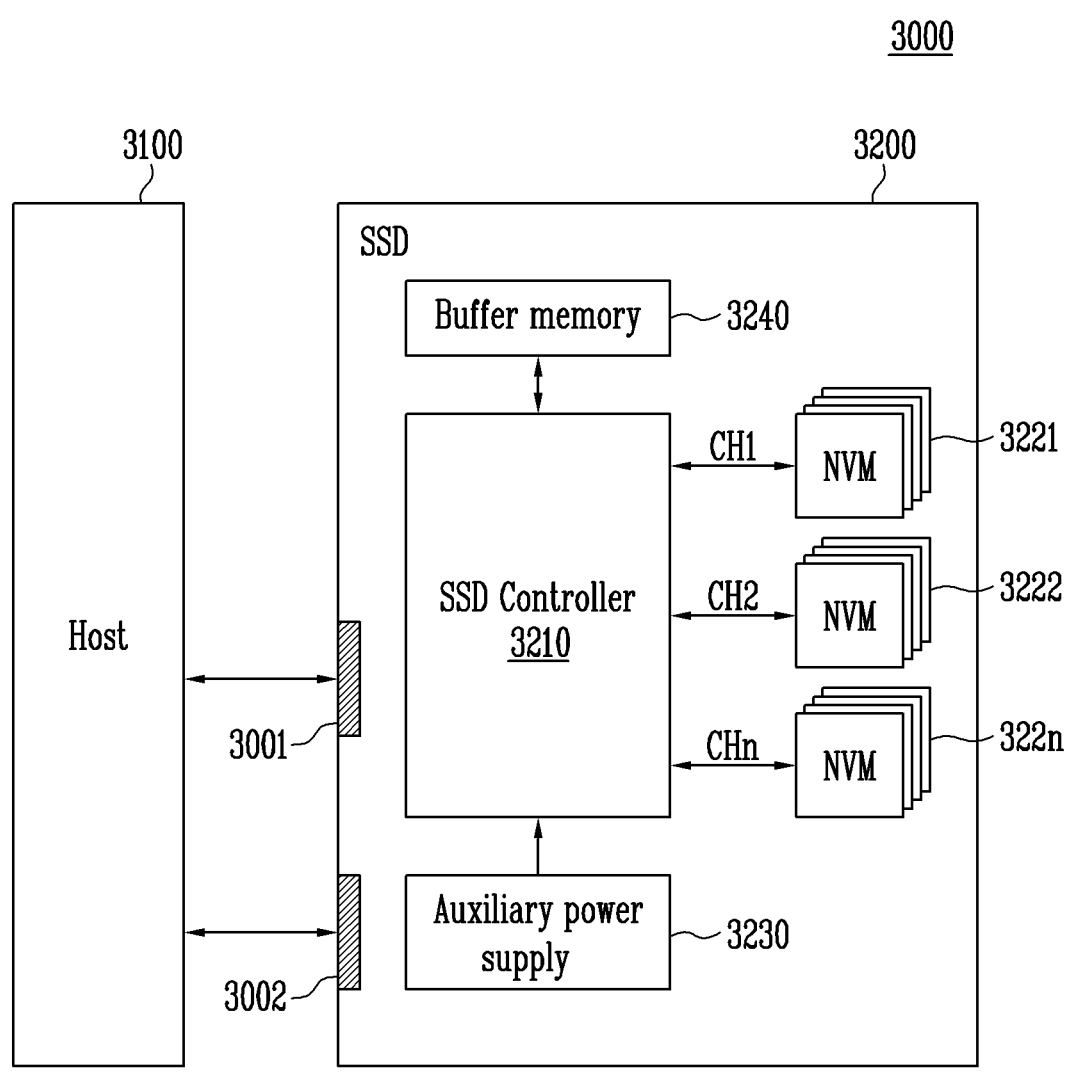
FIG. 10 is a block diagram illustrating a solid state drive (SSD) system to which a storage device according to an embodiment of the present disclosure is applied.

FIG. 10 is a block diagram illustrating a solid state drive (SSD) system to which a storage device according to an embodiment of the present disclosure is applied.

Referring to FIG. 10, an SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of nonvolatile memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of nonvolatile memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may be charged with the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the nonvolatile memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 11:
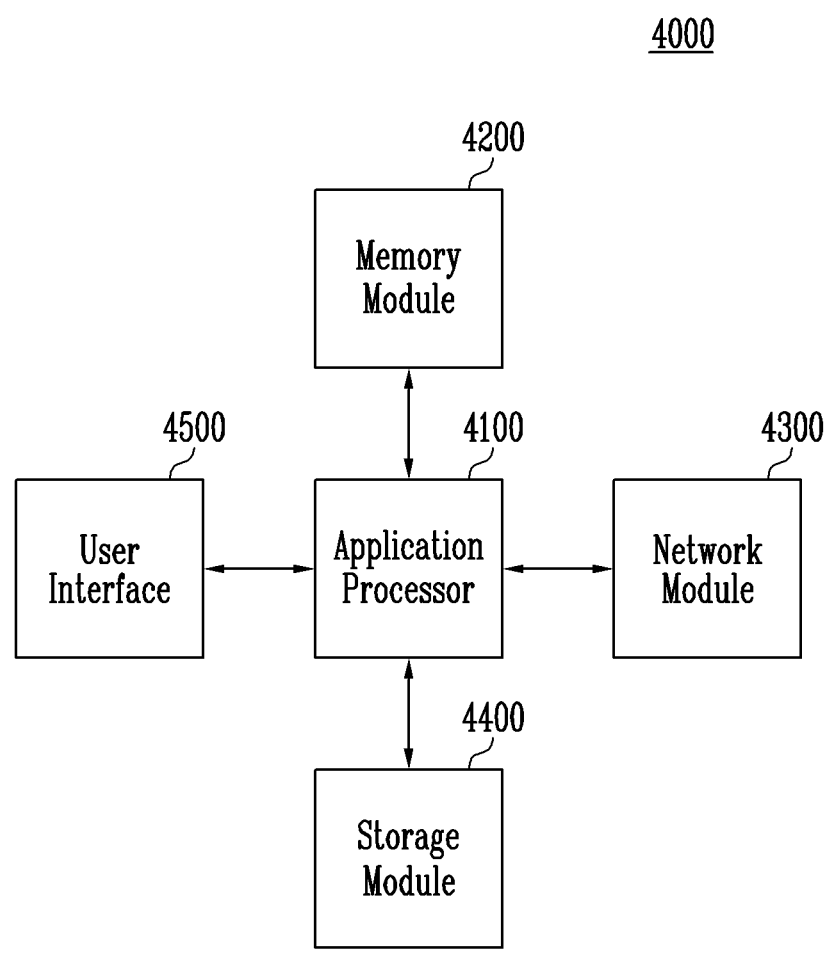
FIG. 11 is a block diagram illustrating a user system to which a storage device according to an embodiment of the present disclosure is applied.

FIG. 11 is a block diagram illustrating a user system to which a storage device according to an embodiment of the present disclosure is applied.

Referring to FIG. 11, a user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A storage device comprising:
  a memory device including a plurality of memory blocks;
  a plurality of cache buffers configured to temporarily store data received from a host; and
  a memory controller configured to:
  in response to a write request and write data received from the host while previously received write data is stored in a first cache buffer corresponding to attribute information of the previously received write data, store the write data in a second cache buffer corresponding to attribute information of the write data, from among the plurality of cache buffers, and
  in response to a logical address of the previously received write data being the same as a logical address of the write data, control the first cache buffer to store the previously received write data in the memory device before the write request is processed.

2. The storage device of claim 1, wherein the memory controller comprises:
  a plurality of command list storages respectively corresponding to the plurality of cache buffers and respectively storing commands corresponding to logical addresses of data stored in the plurality of cache buffers; and
  a host controller configured to generate a command corresponding to the logical address of the write data or a flush command to store the previously received write data stored in the first cache buffer into the memory device before the write request is processed; and
  an operation controller configured to control the memory device according to the flush command or the command corresponding to the logical address of the write data.

3. The storage device of claim 2, wherein the host controller comprises:
  a buffer controller configured to store the write data in the second cache buffer corresponding to the attribute information of the write data included in the write request;
  a redundant data search component configured to generate redundant data information on whether a command corresponding to the previously received write data with the logical address that is the same as the logical address of the write data is stored in one of the plurality of command list storages; and
  a command generator configured to provide the command corresponding to the logical address of the write data or the flush command based on the redundant data information.

4. The storage device of claim 3, wherein the redundant data information includes information on the one of the plurality of command list storages in which the command corresponding to the previously received write data with the logical address that is the same as the logical address of the write data is stored.

5. The storage device of claim 3, wherein the command generator generates a flush command for one of the plurality of cache buffers that corresponds to the one of the plurality of command list storages in which the command corresponding to the previously received write data with the logical address that is the same as the logical address of the write data is stored, in response to the redundant data information indicating that the command corresponding to the previously received write data with the logical address that is the same as the logical address of the write data exists and is stored in the one of the plurality of command list storages, and in response to the flush command, the operation controller controls the memory device to perform a program operation of storing the previously received write data stored in the one of the plurality of cache buffers that corresponds to the one of the plurality of command list storages in which the command corresponding to the previously received write data with the logical address that is the same as the logical address of the write data is stored.

6. The storage device of claim 3, wherein the command generator is configured to generate a command corresponding to the logical address of the write data when the redundant data information includes information that the command corresponding to the previously received write data with the logical address that is the same as the logical address of the write data is not found among the commands stored in the plurality of command list storages, and the operation controller stores the command corresponding to the logical address of the write data in one of the plurality of command list storages corresponding to the one of the plurality of cache buffers in which the write data is stored.

7. The storage device of claim 3, wherein the attribute information of the write data is information indicating whether the write data corresponds to hot data or cold data.

8. The storage device of claim 3, wherein the attribute information of the write data includes information on an application that has generated the write data.

9. The storage device of claim 3, wherein the attribute information of the write data includes information on an access response speed for the write data.

10. The storage device of claim 3, wherein the attribute information includes information on reliability required for the write data.

11. The storage device of claim 1, wherein the memory controller is configured to control different cache buffers from among the plurality of cache buffers to store data in different memory blocks from among the plurality of memory blocks.

12. The storage device of claim 1, wherein the memory controller controls the memory device to store data, which is stored in the first cache buffer from among the plurality of cache buffers, in a first memory block from among the plurality of memory blocks that utilizes a method of storing one bit for each memory cell, and to store data, which is stored in the second cache buffer from among the plurality of cache buffers, in a second memory block from among the plurality of memory blocks that utilizes a method of storing a plurality of bits for each memory cell.

13. A memory controller that controls a memory device, comprising:

a first cache buffer configured to temporarily store data having a first attribute among data provided from a host;

a second cache buffer configured to temporarily store data having a second attribute among the data provided from the host;

a first command list storage configured to store commands related to a logical address of the data stored in the first cache buffer;

a second command list storage configured to store commands related to a logical address of the data stored in the second cache buffer; and a write operation controller configured to control the memory device to store the data that is temporarily stored in the second cache buffer in the memory device when a write data having the first attribute is input from the host and a command related to the same logical address as a logical address of the write data is stored in the second command list storage.

14. The memory controller of claim 13, wherein the write operation controller stores the write data in the first cache buffer and stores a command related to the logical address of the write data in the first command list storage.

15. The memory controller of claim 13, wherein when the command related to the same logical address as the logical address of the write data is stored in the second command list storage, the write operation controller controls the memory device to perform a program operation of storing the data, which is temporarily stored in the second cache buffer, in the memory device.

16. The memory controller of claim 15, wherein when the program operation is completed, the write operation controller initializes the second cache buffer and the second command list storage.

17. The memory controller of claim 13, wherein the data having the first attribute is hot data, and the data having the second attribute is cold data.

18. The memory controller of claim 13, wherein the data having the first attribute and the data having the second attribute are data generated from different applications.

19. The memory controller of claim 13, wherein the data having the first attribute is data requiring relatively higher reliability than the data having the second attribute.

20. A method of operating a memory controller that controls a memory device, the method comprising:

temporarily storing first data received from a host in a first cache buffer corresponding to a first attribute of the first data among a plurality of cache buffers;

temporarily storing second data received from the host in a second cache buffer corresponding to a second attribute of the second data among the plurality of cache buffers; and in response to a logical address of the first data being the same as a logical address of the second data controlling the first cache buffer storing the first data to store the first data in the memory device, before storing the second data in the memory device.

* * * * *